United States Patent
Sherwood et al.

(10) Patent No.: US 9,898,609 B2
(45) Date of Patent: *Feb. 20, 2018

(54) TRUSTED BOOT OF A VIRTUAL MACHINE

(71) Applicant: International Business Machines Corporation, Armonk, NY (US)

(72) Inventors: David Sherwood, Manchester (GB); James W. Walker, Manchester (GB); Travis Walton, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/867,265

(22) Filed: Sep. 28, 2015

(65) Prior Publication Data

US 2016/0019393 A1    Jan. 21, 2016

Related U.S. Application Data

(63) Continuation of application No. 13/929,334, filed on Jun. 27, 2013.

(30) Foreign Application Priority Data

Jun. 29, 2012   (GB) .................................. 1211544.0

(51) Int. Cl.
   *G06F 21/57*   (2013.01)
   *G06F 9/455*   (2018.01)
   (Continued)

(52) U.S. Cl.
   CPC ........ *G06F 21/575* (2013.01); *G06F 9/45533* (2013.01); *G06F 9/45558* (2013.01);
   (Continued)

(58) Field of Classification Search
   USPC ........ 713/187, 150, 163, 181; 726/2, 21, 36; 380/255, 264, 276
   See application file for complete search history.

(56) References Cited

U.S. PATENT DOCUMENTS

| | | | |
|---|---|---|---|
| 7,587,595 B2 | 9/2009 | Scarlata et al. |
| 7,707,411 B2 | 4/2010 | Bade et al. |

(Continued)

FOREIGN PATENT DOCUMENTS

| | | |
|---|---|---|
| CN | 101488173 A | 7/2009 |
| EP | 2194476 A1 | 6/2010 |

OTHER PUBLICATIONS

Intellectual Property Office Search Report, dated Nov. 13, 2012, regarding Application No. GB1211544.0, 4 pages.

(Continued)

*Primary Examiner* — Abu Sholeman
*Assistant Examiner* — Sharif E Ullah
(74) *Attorney, Agent, or Firm* — Yee & Associates, P.C.; Grant Johnson (57) ABSTRACT

A method, system and program product for performing a trusted boot of a virtual machine comprises the steps of executing, in turn, a series of components of the trusted boot, performing a function on each component prior to the execution of the respective component, storing the output of the functions in a virtual trusted platform module, detecting that the virtual trusted platform module has not responded to the storing of the output of a function in the virtual trusted platform module, and generating a request that the virtual trusted platform module be disabled.

7 Claims, 6 Drawing Sheets

(51) Int. Cl.
  *G06F 21/52* (2013.01)
  *G06F 11/14* (2006.01)
  *G06F 9/44* (2018.01)

(52) U.S. Cl.
  CPC .......... *G06F 11/1484* (2013.01); *G06F 21/52* (2013.01); *G06F 9/4401* (2013.01); *G06F 2009/45575* (2013.01); *G06F 2009/45591* (2013.01)

(56) References Cited

U.S. PATENT DOCUMENTS

| | | | |
|---|---|---|---|
| 7,716,494 B2 | 5/2010 | Liu et al. | |
| 7,865,712 B2* | 1/2011 | Levit-Gurevich | G06F 21/53 713/1 |
| 8,042,190 B2* | 10/2011 | Sahita | G06F 21/575 713/187 |
| 8,074,262 B2 | 12/2011 | Scarlata | |
| 8,209,542 B2* | 6/2012 | Kumar | G06F 21/575 713/174 |
| 8,584,229 B2* | 11/2013 | Brutch | G06F 21/629 380/279 |
| 8,856,544 B2* | 10/2014 | Bosch | G06F 21/53 709/223 |
| 2006/0015717 A1 | 1/2006 | Liu et al. | |
| 2007/0094719 A1 | 4/2007 | Scarlata | |
| 2007/0300207 A1* | 12/2007 | Booth | G06F 21/575 717/126 |
| 2008/0282348 A1 | 11/2008 | Proudler et al. | |
| 2009/0063857 A1* | 3/2009 | Bade | G06F 21/53 713/164 |
| 2009/0165117 A1* | 6/2009 | Brutch | G06F 21/629 726/14 |
| 2009/0172822 A1* | 7/2009 | Sahita | G06F 21/575 726/27 |
| 2012/0265976 A1 | 10/2012 | Spiers et al. | |
| 2014/0013327 A1 | 1/2014 | Smith et al. | |

OTHER PUBLICATIONS

Kong, "Protecting the confidentiality of virtual machines against untrusted host," 2010 International Symposium on Intelligence Information Processing and Trusted Computing, Oct. 2010, pp. 364-368.

Zhang et al., "Trusted Connection System based on Virtual Machine Architecture," 2010 3rd IEEE International Conference on Computer Science and Information Technology, vol. 1, Jul. 2010, pp. 192-196.

Office Action, dated Mar. 29, 2016, regarding U.S. Appl. No. 13/929,334, 16 pages.

Notice of Allowance, dated Mar. 22, 2017, regarding U.S. Appl. No. 13/929,334, 15 pages.

* cited by examiner

PRIOR ART

TRUSTED BOOT OF A VIRTUAL MACHINE

CROSS-REFERENCE TO RELATED APPLICATION(S)

This application is a continuation of and claims the benefit of priority to U.S. patent application Ser. No. 13/929,334, filed on Jun. 27, 2013 and entitled "Trusted Boot of a Virtual Machine," which claims the benefit of priority to United Kingdom Patent Application No. GB 1211544.0, filed on Jun. 29, 2012 and entitled "Trusted Boot of a Virtual Machine," the contents of which are hereby incorporated by reference.

FIELD OF THE INVENTION

This invention relates to a method of, and system for, performing a trusted boot of a virtual machine.

BACKGROUND

In computing, a Trusted Platform Module (TPM) is the name of a specification of a secure processor that can store cryptographic keys that protect information, as well as the name of a hardware component that implements the specification. A Trusted Platform Module offers facilities for the secure generation of cryptographic keys and limitation of their use, in addition to a hardware true random number generator and also includes capabilities such as remote attestation and sealed storage. Software can use a Trusted Platform Module to authenticate hardware devices. Since each TPM chip has a unique and secret RSA key burned in as it is produced, it is capable of performing platform authentication. For example, it can be used to verify that a system seeking access is the expected system.

The virtualization of the Trusted Platform Module is also known. For example, U.S. Pat. No. 7,707,411 discloses a method for implementing a trusted computing environment within a data processing system. A hypervisor is initialized within the data processing system, and the hypervisor supervises a plurality of logical, partitionable, runtime environments within the data processing system. The hypervisor reserves a logical partition for a hypervisor-based trusted platform module (TPM) and presents the hypervisor-based trusted platform module to other logical partitions as a virtual device via a device interface. Each time that the hypervisor creates a logical partition within the data processing system, the hypervisor also instantiates a logical TPM within the reserved partition such that the logical TPM is anchored to the hypervisor-based TPM. The hypervisor manages multiple logical TPM's within the reserved partition such that each logical TPM is uniquely associated with a logical partition.

In a virtual computing environment that uses a virtual trusted platform module, it is likely that the virtual trusted platform module executes as a thread/process of some secured part of the hypervisor (i.e. tamper-proof from the virtual machine using the virtual trusted platform module). The virtual trusted platform module is used as part of a trusted boot of the virtual machine, with components of the boot measuring interesting parts and storing those measurements in the virtual trusted platform module (an operation called Platform Configuration Register (PCR) extend). These measurements form what is known as the chain of trust and an external observer uses a cryptographically signed copy of the chain to assert the trust of the system. The chain of trust is therefore critical, no hole must be allowed in the chain or there exists an attack where a malicious component could spoof itself as trusted.

Since the virtual trusted platform module is essentially a software component, it can fail to operate as expected. For example, a known problem occurs when a virtual machine is performing a trusted boot and attempts a virtual trusted platform module operation and the virtual trusted platform module fails to respond, as there is then a question as to the action that the system should take. In the prior art there are two options, firstly, halt the boot until the virtual trusted platform module responds or secondly, time-out and continue the boot. The former option is not desirable as it leads to a denial of service and the latter option leads to a security hole. This can occur if the virtual trusted platform module never entered a measurement, but returning an error, was stalled doing so, simply allowing the boot to continue leaves a hole in the chain. If the next boot component is actually not trusted it will not have been measured and it could fill the hole in the chain with a fake trusted measurement which would allow an untrusted system to masquerade as trusted.

BRIEF SUMMARY OF THE INVENTION

According to a first aspect of the present invention, there is provided a method of performing a trusted boot of a virtual machine, the method comprising the steps of executing, in turn, a series of components of the boot, performing a function on each component prior to the execution of the respective component, storing the output of the functions in a virtual trusted platform module, detecting that the virtual trusted platform module has not responded to the storing of an output of a function in the virtual trusted platform module, and generating a request that the virtual trusted platform module be disabled.

According to a second aspect of the present invention, there is provided a system for performing a trusted boot of a virtual machine, the system comprising a server arranged to execute, in turn, a series of components of the boot, perform a function on each component prior to the execution of the respective component, store the output of the functions in a virtual trusted platform module, detect that the virtual trusted platform module has not responded to the storing of an output of a function in the virtual trusted platform module, and generate a request that the virtual trusted platform module be disabled.

According to a third aspect of the present invention, there is provided a computer program product on a computer readable medium for performing a trusted boot of a virtual machine, the product comprising instructions for executing, in turn, a series of components of the boot, performing a function on each component prior to the execution of the respective component, storing the output of the functions in a virtual trusted platform module, detecting that the virtual trusted platform module has not responded to the storing of an output of a function in the virtual trusted platform module, and generating a request that the virtual trusted platform module be disabled.

Owing to the invention, it is possible to provide a practical solution to the problem of a non-responsive virtual trusted platform module that will not result in any security weaknesses. The virtual trusted platform module will no longer be available so the boot of the virtual machine cannot ever be mistaken for a secure and trusted state. The boot will continue to completion which will have the advantage of avoiding any denial of service but the boot will not be labelled as trusted, as the virtual trusted platform module cannot be accessed to see any chain of trust generated during the trusted boot process.

In a preferred embodiment, the system can be implemented by extending a hypervisor's functionality to include a mechanism that kills the virtual trusted platform module. If a boot component times out whilst trying to build a chain of trust, but does not wish to wait, the safest operation is to destroy the entire chain of trust, by killing the virtual trusted platform module. The boot will continue and the system will be available. More importantly, the system will show up as untrusted, since no chain-of-trust will be available to the system/person wishing to attest. This is a much safer position than providing an insecure chain of trust to any attester who might otherwise access a virtual trusted platform module that is present.

The implementation of the system is must provide a mechanism that stops the virtual trusted platform module from being operational so that it is unusable by the virtual machine. A hyper-call is the simplest method and the hypervisor must perform some operation to disable the virtual trusted platform module, for example severing the communication mechanism between the virtual machine and virtual trusted platform module, or just killing the virtual trusted platform module as if it were a run-away process. Once the virtual trusted platform module has been killed it must only be re-enabled by rebooting the virtual-machine to start the trusted boot process from the start.

BRIEF DESCRIPTION OF THE DRAWINGS

Preferred embodiments of the present invention will now be described, by way of example only, with reference to the following drawings, in which:—

DETAILED DESCRIPTION OF THE DRAWINGS

Figure 1:
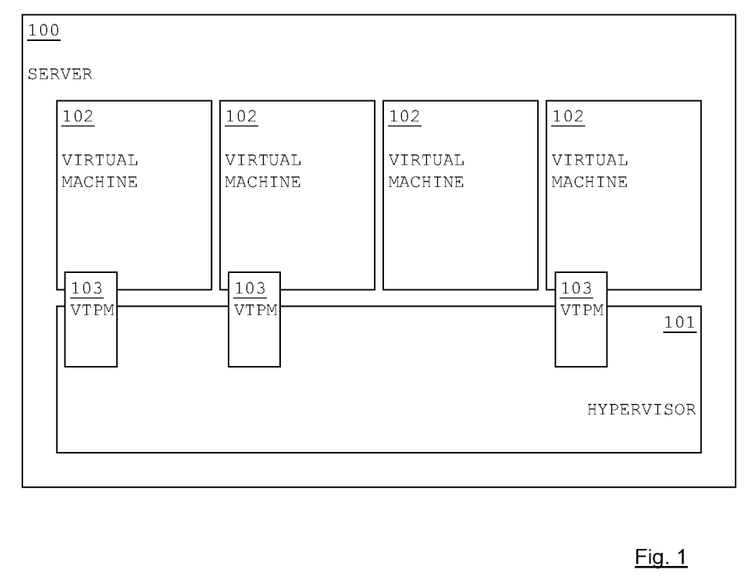
FIG. 1 is a schematic diagram of a server running a hypervisor and multiple virtual machines.

FIG. 1 illustrates a server 100 that is running a hypervisor 101 and four virtual machines 102. Three of the virtual machines are operated using virtual trusted platform modules 103. Each virtual machine 102 is created so that a remote client device can connect to the server 100 and run a session on a virtual machine 102 as part of a cloud computing service. This reduces the processing and software requirements of the connecting client device and is a more efficient method of delivering computing services to multiple users within a large organisation, for example. The virtual machines 102 are created via a boot process, accessed by the remote client device and then deleted in due course.

The hypervisor 101 is effectively a software platform that supports different operating systems and is the component that communicates with the hardware of the server 100. The virtual machines 102 need not be identical, they could use different operating systems as long as they are supported by the hypervisor 101, and indeed virtual machines 102 that are using the same operating system could have very different applications loaded as part of the virtual machine session being provided. The hypervisor 101 is the intermediary between the software virtual machines 102 and the hardware that makes up the server 100. The users of the virtual machines 102 do not have access to the hypervisor 101.

The virtual trusted platform modules 103 are virtualizations of hardware trusted platform modules which have a variety of uses, principally related to security. The virtual trusted platform modules 103 provide cryptographic functions and secure storage, for example. The virtual trusted platform modules 103 will be used during a so-called "trusted boot" process. This process is the original boot of the virtual machine 102 that takes place in conjunction with a respective virtual trusted platform module 103. During the trusted boot process, data generated from the process is stored in a virtual trusted platform module 103. This data can be accessed by a suitably secure third party in order to check the boot process.

Figure 2:
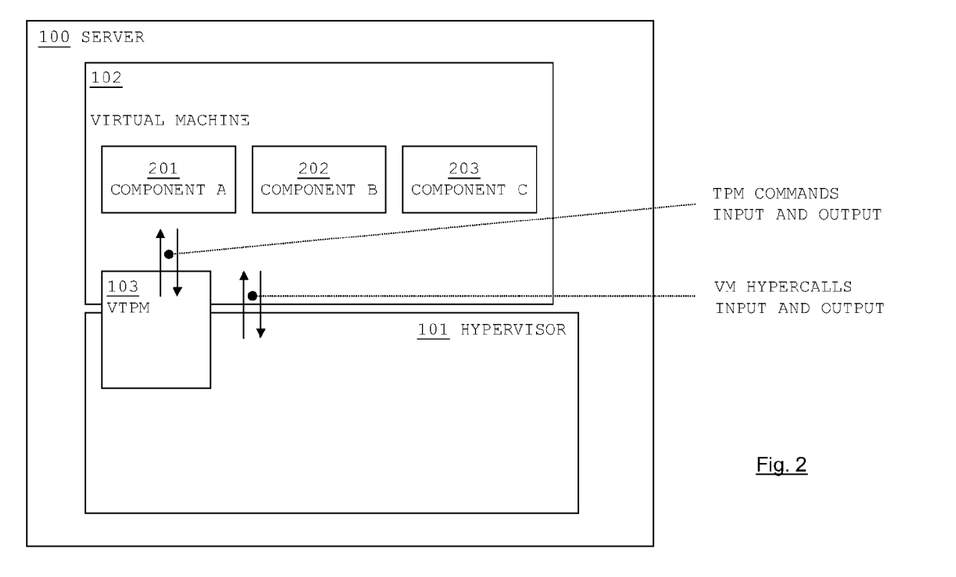
FIG. 2 is a further schematic diagram of the server with the hypervisor and a single virtual machine.

FIG. 2 shows more detail of a single virtual machine 102 being run by the server 100. As discussed above, the hypervisor 101 provides the interface between the hardware of the server 100 and the virtual machine 102. The hypervisor 101 runs directly on the server's hardware to control the hardware and to manage the virtual machine's operating system. A virtual trusted platform module 103 is also provided that is dedicated to the specific session of the virtual machine 102 and this is also managed by the hypervisor 101. The virtual machine 102 provides a session for a remote client device that connects to the server 100 in order to use the computing resources provided.

Two sets of calls are shown in FIG. 2. Inputs and output commands between the virtual machine 102 and the virtual trusted platform module 103 are shown as are virtual machine hypercall input and outputs between the virtual machine 102 and the hypervisor 101. These calls show the flow of commands and hypercalls between the different resources present on the server 100. In general, the virtual machine 102 communicates with the hypervisor 101 and the hypervisor 101 communicates with the hardware of the server 100. The hypervisor has overall control of the virtual trusted platform module 103 and but cannot directly access the data stored by the virtual trusted platform module 103.

In FIG. 2, three components 201, 202 and 203 of the virtual machine 102 are shown. These are respectively labelled as component A, component B and component C. In reality, the virtual machine 102 will have many more such components, but only three are shown in the Figure for purposes of clarity. These components are loaded in turn when the virtual machine is booted. Component A will be loaded and then executed, followed by component B being loaded and executed and so on. Once this process is completed, then the virtual machine 102 will be booted and ready to use. As this boot process is carried out, information will be stored in the virtual trusted platform module 103.

Figure 3:
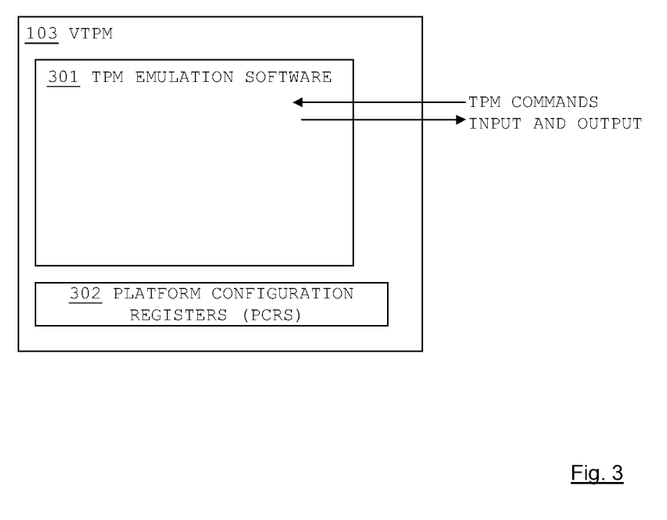
FIG. 3 is a schematic diagram of a virtual trusted platform module.

FIG. 3 shows more detail of the virtual trusted platform module 103. Two components of the virtual trusted platform module 103 are shown; being TPM emulation software 301 and platform configuration registers 302. The emulation software 301 is the software that is effectively providing the virtualization of the trusted platform module, which is normally provided as a dedicated hardware chip (which obviously cannot be used in the type of virtual/cloud computing described herein). The emulation software 301 communicates with the virtual machine 102 to which it is attached. The platform control registers 302 of the virtual trusted platform module 103 provide secure storage and can only be accessed via the emulation software 301.

The virtual trusted platform module 103 plays an important role during the trusted boot process mentioned above. As each of the components 201, 202 etc. are loaded and then subsequently executed, a function is executed with respect to each of the components after they are loaded, but before they are executed. This function could be a known and conventional hashing function such as SHA1 which is executed on each component in turn. The SHA1 hashing function will operate on the loaded source code that makes up the relevant component to provide a numerical output. This output is passed from the virtual machine 102 to the virtual trusted platform module 103 for secure storage in the platform configuration registers 302.

The purpose of this process is that the outputs of the hashing function on each component create a so-called chain of trust, which is effectively a series of numbers that have been generated from the components. This chain of trust will allow a suitably attested entity to check that the boot of the virtual machine 102 is secure. For example, any security breach such as an additional component or a component that has been changed without the necessary authorisation will change the chain of trust from that which is expected, as the output of the hashing function will be different if the component is changed. This process provides security for the provider of the virtual machines 102.

Figure 4:
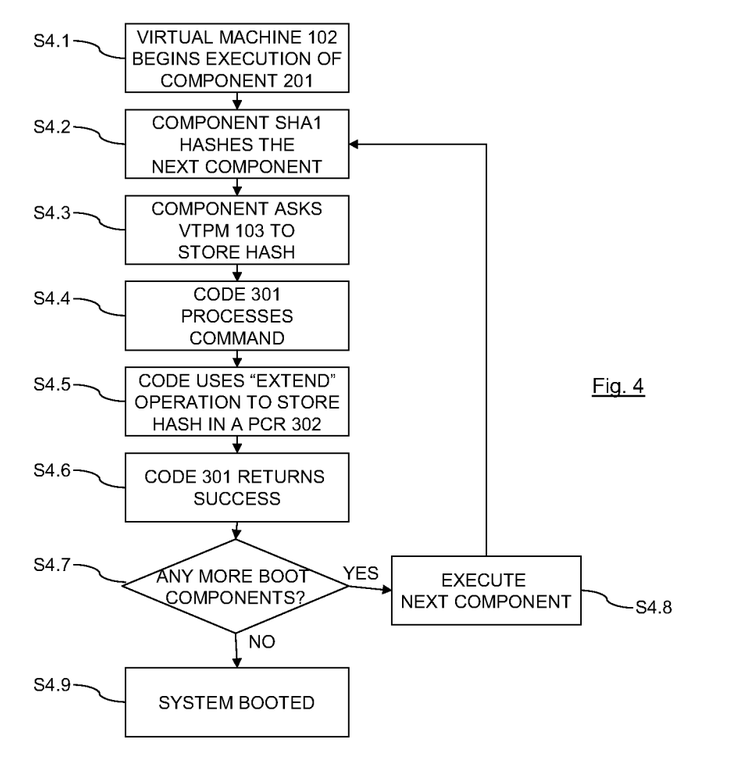
FIG. 4 is a flowchart of trusted boot process.

The trusted boot process of loading a virtual machine 102 is shown in the flowchart of FIG. 4. The first step S4.1 is the virtual machine 102 beginning the execution of the component 201, as illustrated in FIG. 2 and discussed above. At the next step, S4.2, the currently loaded and executing component performs a SHA1 hash function on the next component. At the start of the process, in the first cycle through the flowchart, step S4.2 will mean that component 201 is performing a hashing operation on the component 202. The preferred hashing function is the SHA1 function, but any such suitable hashing function can be used at this stage.

Once the hashing function is completed, the next step in the process, step S4.3 comprises the currently loaded and executing component asking the virtual trusted platform module 103 to store the hash (the hash being the output of the hashing function). As above, at the start of the process, in the first cycle through the flowchart, step S4.3 will mean that component 201 is communicating with the virtual trusted platform module 103 to store the hash. At step S4.4 the emulation code 301 of the virtual trusted platform module 103 processes the received command from the current component. At step S4.5, the code 301 uses an extend operation to store the hash in a platform configuration register 302.

Once the hash has been stored in the platform configuration register 302, the code 301 will return a success message to the current component and the process will move onto step S4.7. At this step, a check is made to see if there are any more boot components to be loaded and executed. If yes, then the process moves to step S4.8, where the next component is executed and the method returns to step S4.2 to repeat the hashing process over again, with the current component performing a hashing function on the next component and storing the output of the function in the platform configuration register 302 of the virtual trusted platform module 103.

Figure 5:
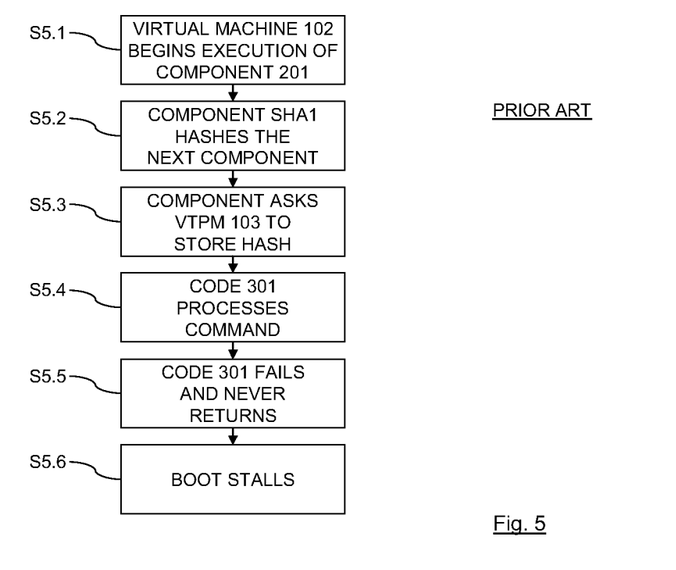
FIG. 5 is a flowchart of a prior art failed trusted boot process.

As mentioned above, since the virtual trusted platform module 103 is a software component, there exists the possibility that it will malfunction through the presence of one or more software bugs. In the virtualization provided by the server 100, an example of how this is handled by prior art systems is shown in the flowchart of FIG. 5. The process shown in FIG. 5 relates to a virtualization configuration that is assumed to be the same as that shown in FIGS. 1 to 3 and described above with reference to those Figures. A server 100 is operating a hypervisor 101 with one or more virtual machines 102 present. A virtual trusted platform module 103 is present for the virtual machine 102 under consideration.

The trusted boot process of FIG. 5 is identical to that shown in FIG. 4, with respect to the first four steps of the process. In FIG. 5, the steps S5.1 to S5.4 are materially the same as the respective steps S4.1 to S4.4 of FIG. 4. The current component has hashed the next component and has supplied the output to the virtual trusted platform module 103 and the emulation code processes the received command from the current component at step S5.4. At step S5.5 however, the code 301 fails (for whatever reason) and never responds to the current component. This is a different outcome from the process of FIG. 4.

At step S5.6, the boot process can be considered to have stalled after the failure of the emulation code 301 of the virtual trusted platform module 103 to respond. There are a various possibilities as to what might happen next. The boot could continue, but it would never be known if the chain of trust (the hash values) was correctly assembled. If the next boot component was actually a malicious piece of code, and the virtual trusted platform module 103 actually just returned an error i.e. never extended a platform configuration register 302, the malicious code can insert a fake, "good" measurement in the platform configuration register 302 to mask the presence of the malicious code.

Figure 6:
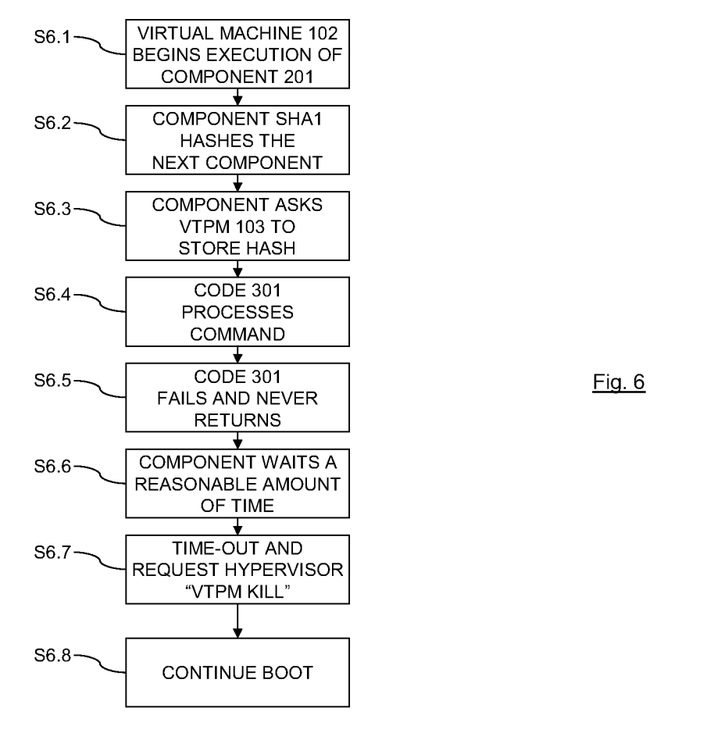
FIG. 6 is a flowchart of an improved trusted boot process.

FIG. 6 is a flowchart of an improved method of performing a trusted boot of a virtual machine 102, showing how the server 100 is arranged to operate to remove the problems associated with any failure of the virtual trusted platform module 103 to respond to the request to store a hash value in a platform configuration register 302. The flowchart shown in FIG. 6 corresponds to the flowchart of FIG. 4 up to the step S6.4, which is equivalent to step S4.4. At step S6.5, the emulation code 301 of the virtual trusted platform module 103 fails to respond and does not return anything to the current component of the virtual machine 102.

At step S6.6, the current component waits a reasonable amount of time for the response, which time limit can be predetermined and the at step S6.7, the component times out and makes a request to the hypervisor 101 to perform a "VTPM kill". Essentially, once the current component has detected that the virtual trusted platform module 103 has not responded to the storing of an output of the hashing function in the virtual trusted platform module 103 then the current component will generate a request that the virtual trusted platform module 103 be disabled. In a preferred embodiment, the hypervisor will then immediately disable the virtual trusted platform module 103 using a hyper-call.

The server 100 therefore provides a mechanism that stops the virtual trusted platform module 103 from being operational, so that it is unusable by the virtual machine 102. A hyper-call is the simplest method of achieving this and the hypervisor 101 must perform some operation to disable the virtual trusted platform module 103, for example severing the communication mechanism between the virtual machine 102 and virtual trusted platform module 103, or just killing the virtual trusted platform module 103 as if it were a run-away process. Once the virtual trusted platform module has been killed it can only be re-enabled by rebooting the virtual-machine 103 to start the trusted boot process from the beginning. Note that any subsequent hibernation or migration of the virtual machine 102 will not affect the fact that the virtual trusted platform module 103 is no longer operational.

The process shown in FIG. 6 then completes at step S6.8 by continuing the boot process, effectively returning to step S4.7 of FIG. 4. This provides a practical solution to the problem of a non-responsive virtual trusted platform module 103 that will not result in any security weaknesses. The virtual trusted platform module 103 will no longer be available so the boot of the virtual machine 102 cannot be mistaken for a secure and trusted state. The boot will continue to completion, which will have the advantage of avoiding any denial of service, but the boot will not be labelled as trusted, as the virtual trusted platform module 103 cannot be accessed to see any chain of trust generated during the trusted boot process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of performing a trusted boot of a virtual machine, the method comprising the steps of:
   executing, in turn, a series of components of the trusted boot;
   performing a function on each respective component of the series of components prior to the execution of the respective component when attempting to establish a chain of trust for the series of components;
   storing an output of the function in a virtual trusted platform module;
   detecting that the virtual trusted platform module has not responded to the storing of the output of the function in the virtual trusted platform module;
   generating a request that the virtual trusted platform module be disabled; and
   transmitting the generated request to a hypervisor and disabling the virtual trusted platform module using a command from the hypervisor.

2. A method according to claim 1, wherein the step of detecting that the virtual trusted platform module has not responded to the storing of the output of the function in the virtual trusted platform module comprises waiting for a predetermined time period.

3. A method according to claim 1, and further comprising transmitting the generated request to a hypervisor and disabling the virtual trusted platform module using a command from the hypervisor.

4. A method according to claim 1, wherein the step of performing a function on each component prior to the execution of the respective component comprises performing a predefined hashing function on the respective component.

5. A method according to claim 1, wherein the step of performing a function on each component prior to the execution of the respective component is performed by the previously loaded component.

6. The method according to claim 1, wherein the request is generated responsive to detecting that the virtual trusted platform module has not responded to the storing of the output of the function in the virtual trusted platform module.

7. The method according to claim 1, and further comprising executing a hypervisor to supervise a plurality of logical, partitionable runtime environments within the server, reserve a logical partition for a hypervisor-based trusted platform module, and present the hypervisor-based trusted platform module to another logical partition as the virtual trusted platform module.

* * * * *